(12) United States Patent
Branlard et al.

(10) Patent No.: US 6,369,186 B1
(45) Date of Patent: Apr. 9, 2002

(54) CROSS-LINKABLE COMPOSITIONS CONTAINING FUNCTIONALIZED SILICON FLUIDS AND USE OF THESE COMPOSITIONS FOR PREPARING POLYURETHANE FILMS

(75) Inventors: Paul Branlard, Lyons; Nathalie Guennouni, Irigny; Philippe Karrer, Mulhouse-Bourtzwiller; Gérard Mignani, Lyons, all of (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 09/297,856
(22) PCT Filed: Nov. 5, 1997
(86) PCT No.: PCT/FR97/01979
  § 371 Date: Jul. 19, 1999
  § 102(e) Date: Jul. 19, 1999
(87) PCT Pub. No.: WO98/21257
  PCT Pub. Date: May 22, 1998

(30) Foreign Application Priority Data

Nov. 8, 1996 (FR) .............................. 96 13638
Apr. 30, 1997 (FR) .............................. 97 05350

(51) Int. Cl.$^7$ .............................................. C08G 77/04
(52) U.S. Cl. ............................ 528/26; 528/28; 528/30; 528/33; 528/38; 528/43; 525/126; 525/127; 525/128; 525/131
(58) Field of Search ............................. 528/21, 22, 28, 528/12, 20, 26, 30, 33, 38, 43; 525/126, 127, 128, 131

(56) References Cited

U.S. PATENT DOCUMENTS 4,369,300 A * 1/1983 Carter et al. .................. 528/28

* cited by examiner

Primary Examiner—Ana Woodward

(57) ABSTRACT

The invention concerns a novel cross-linkable composition and its use for preparing novel polyurethane films. The cross-linkable composition comprises (a) 20 to 50 wt. % of polyisocyanate, (b) 50 to 80 wt. % of acrylic oligomer containing hydroxyl groupings whose content in weight relative to the acrylic oligomer is between 2.5 and 4.5% and (c) 1 to 10 wt. % of a silicon fluid of formula (1).

7 Claims, No Drawings

CROSS-LINKABLE COMPOSITIONS CONTAINING FUNCTIONALIZED SILICON FLUIDS AND USE OF THESE COMPOSITIONS FOR PREPARING POLYURETHANE FILMS

This application is an application under 35 U.S.C. Section 371 of International Application Number PCT/FR97/01979, filed on Nov. 5, 1997.

The subject-matter of the present invention is novel crosslinkable compositions for forming novel polyurethane films comprising functionalized silicone oils and the use of the novel polyurethane films as protective coating, in particular for car bodies, boat hulls, the bodies of household goods and appliances, or any other surface.

Protective coatings have to possess numerous qualities combining both aesthetic and visual appearances and properties of resistance to external influences. A first fundamental criterion of effectiveness for protective coatings is the ability to withstand acids, in particular in the case of car paints or varnishes; the latter have to withstand the action of acid rain. A second fundamental criterion of effectiveness relates to the hydrophobic qualities, which, of course, must be high. A third fundamental criterion is the resistance to mechanical stresses, such as the resistance to scratching.

Numerous coating or paint compositions comprising silicone oils have been provided. The compositions of U.S. Pat. No. 5,268,215 or those of Patent EP 531,463 should in particular be noted; however, these do not exhibit all the qualities required which make it possible to obtain stable protection which is lasting over time. In addition, these compositions sometimes have to be used in a rigorous and complex way for an application which does not guarantee minimum effectiveness.

The object of the present invention is to provide novel crosslinkable compositions in order to form polyurethane films. These novel crosslinkable compositions, which comprise functionalized silicone oils, have qualities, evaluated according to the criteria above, which are improved with respect to the known compositions of the prior art. In addition, the novel crosslinkable compositions are relatively quick to prepare and are easy to use.

A marked improvement in quality and stability of the properties of resistance to acids, of the properties of resistance to mechanical stresses, such as the resistance to cracking, and of the hydrophobic properties is observed for the novel polyurethane films resulting from the crosslinkable compositions of the invention.

The novel crosslinkable compositions according to the invention comprise:

(a) 20 to 50 weight % of polyisocyanate,
(b) 50 to 80 weight % of acrylic oligomer comprising hydroxyl groups, the content by weight of which with respect to the acrylic oligomer is between 2.5 and 4.5%,
(c) 1 to 10 weight % of a silicone oil of formula (I):

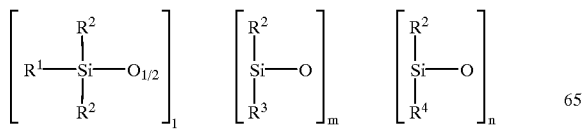

(I)

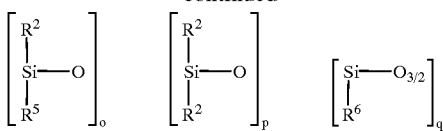

in which:
(1) o and p are identical or different integers of between 1 and 100 and preferably from 1 to 50,
(2) 1 represents an integer such that 1=2+q,
(3) q represents an integer of between 0 and 10,
(4) m represents an integer of between 1 and 60, preferably between 1 and 30, particularly preferably from 1 to 10,
(5) n is an integer such that $20<(100\times m)/(m+n)<60$, preferably $25<(100\times m)/(m+n)<55$,
(6) the symbols $R^1$ and $R^2$ are identical and/or different and represent a hydrocarbon-comprising radical chosen from linear or branched alkyl radicals having from 1 to 4 carbon atoms, linear or branched alkoxy radicals having from 1 to 4 carbon atoms, aryl radicals or alkylaryl radicals and preferably a methyl radical, a phenyl radical, a methoxy radical or an ethoxy radical,
(7) the symbols $R^3$ and $R^4$ are identical and/or different and are chosen from:
monovalent $-(CH_2)_h-Si-(R^1)_3$ radicals where h is between 1 and 10, preferably from 1 to 3,
monovalent aromatic alkylaryl radicals, the linear or branched alkyl part comprising 1 to 4 carbon atoms, the symbol $R^3$ preferably representing the monovalent $-CH(CH_3)C_6H_5$ radical and the symbol $R^4$ preferably representing the monovalent $-CH_2CH_2C_6H_5$ radical,
(8) the symbols $R^5$ and $R^6$ are identical and/or different and represent a monovalent functional group chosen from:
a monovalent primary amine of $-R^7-NH_2$ type where $R^7$ is a linear, branched or cyclic alkyl radical having from 1 to 6 carbon atoms,
a monovalent secondary amine of $-R^8-NH-R^9$ type where $R^8$ and $R^9$, which are identical and/or different, are linear, branched or cyclic alkyl chains having from 1 to 6 carbon atoms,
a monovalent $-(CH_2)_a(NHCH_2CH_2)_bNH_2$ radical where a and b are independent integers:
a is between 1 and 10, preferably 1 to 3,
b is between 0 and 10, preferably 0 or 1,
a monovalent $-(CH_2)_c(OCH_2CH_2)_d(OCH_2CHCH_3)_eOH$ radical where c, d and e are independent integers:
c is between 1 and 20, preferably 1 to 10,
d is between 0 and 70, preferably 0 to 12,
e is between 0 and 70, preferably 0 to 15,
a monovalent $-(CH_2)_fSH$ radical where f is an integer which can range from 1 to 10, preferably from 1 to 3,
a monovalent $-(CH_2)_g-C(R')_2-OH$ radical where g is an integer which can range from 1 to and preferably from 1 to 3, and R' represents a hydrocarbon-comprising radical chosen from a linear or branched alkyl radical having from 1 to 4 carbon atoms, aryl radicals and alkylaryl radicals.

The values of percentages by weight relating to the compounds (a), (b) and (c) refer to the content of total solid matter in the crosslinkable composition, i.e. the solid matter of the three compounds (a), (b) and (c).

According to an advantageous form in accordance with the invention, the properties of resistance to scratching are optimized with a crosslinkable composition comprising (a) 20 to 40 weight % of polyisocyanate, preferably 30%, (b) 60 to 80 weight % of hydroxylated acrylic oligomer, preferably 70%, and (c) 1 to 4 weight % of a silicone oil of formula (I), preferably 2 to 3%, such that the NCO/XH molar ratio in the polyurethane films is between 0.5 and 2 and preferably between 0.80 and 1.1. NCO is the isocyanate functional group of the polyisocyanate and XH represents OH, NH and SH, which are the reactive functional groups of the acrylic polymer and those of the functionalized silicone oil.

The acrylic oligomer generally comprises between 0.1 and 10 weight % of hydroxyl groups. This percentage of hydroxyl groups is advantageously between 1 and 6% and more particularly between 2.5 and 4.5%.

The crosslinkable composition generally comprises a solvent such that the percentage by weight of the compounds (a), (b) and (c) with respect to the crosslinkable composition comprising a solvent is between 40 and 80% and preferably of the order of 50 to 60%. Various types of solvent can be used, for example methyl amyl ketone, butyl acetate and the product Solvesso 100 (resulting from a petroleum fraction).

The structure of the silicone oil present in the composition according to the invention is chosen such that the said oil is weakly miscible in the system composed mainly of the mixture of acrylic oligomer and of polyisocyanate. On this subject, the presence of the 2-phenylethyl and 1-phenylethyl groups within the structure of the silicone oil controls the degree of miscibility of the chain of the silicone oil in the acrylic oligomer and polyisocyanate system. The level of Si units of the silicone oil modified by these groups varies from 20 to 40%.

In addition, according to another advantageous form of the invention, the crosslinkable composition comprises silicone oils functionalized with units of HALS type. In this case, at least a portion of the symbols $R^5$ and $R^6$, which are alike and/or different, of the silicone oil represent a monovalent functional group chosen from a residue of formula (II) defined below such that the ratio of the number of functional groups of formula (II) to the number of Si units of the silicone oil is between 5 and 15%:

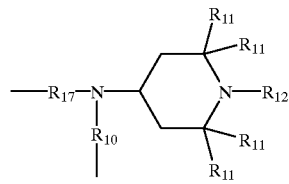

(II)

in which:
(1) the monovalent $R^{11}$ radicals are identical and/or different and are chosen from linear or branched alkyl radicals having 1 to 3 carbon atoms and the phenyl radical,
(2) the monovalent $R^{12}$ radical represents a hydrogen radical,
(3) the $R^{10}$ radical is a divalent hydrocarbon-comprising radical chosen from:
  linear or branched alkylene radicals having 2 to 18 carbon atoms,
  alkylenecarbonyl radicals, the linear or branched alkylene part of which comprises 2 to 20 carbon atoms,
  alkylenecyclohexylene radicals, the linear or branched alkylene part of which comprises 2 to 12 carbon atoms and the cyclohexylene part of which comprises an OH group and optionally 1 or 2 alkyl radicals having 1 to 4 carbon atoms,
  radicals of formula —$R^{13}$—O—$R^{13}$— in which the $R^{13}$ radicals, which are identical or different, represent alkylene radicals having 1 to 12 carbon atoms,
  radicals of formula —$R^{13}$—O—$R^{13}$— in which the $R^{13}$ radicals have the meanings indicated above and one of them or both are substituted by one or two —OH group(s);
  radicals of formula —$R^{13}$-COO—$R^{13}$— in which the $R^{13}$ radicals have the meanings indicated above,
  radicals of formula —$R^{14}$—O—$R^{15}$—O—CO—$R^{14}$— in which the $R^{14}$ and $R^{15}$ radicals, which are identical and/or different, represent alkylene radicals having 2 to 12 carbon atoms and the $R^{10}$ radical is optionally substituted by a hydroxyl radical,
U represents —O— or —$NR^{16}$—, $R^{16}$ being a radical chosen from a hydrogen atom, a linear or branched alkyl radical comprising 1 to 6 carbon atoms and a divalent radical of formula (III):

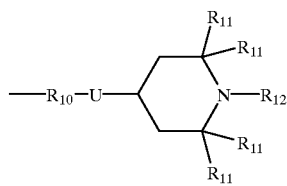

(III)

in which $R^{10}$ has the meaning indicated above, $R^{11}$ and $R^{12}$ have the meanings indicated above and $R^{17}$ represents a linear or branched divalent alkylene radical having from 1 to 12 carbon atoms, one of the valence bonds (that of $R^{17}$) being connected to the atom of —$NR^{16}$— and the other (that of $R^{10}$) being connected to a silicon atom.

According to a preferred form of the invention, the ratio of the number of functional units of type (II) to the number of Si units of the silicone oil is of the order of 6%.

Furthermore, the $R^{12}$ radical of the formula (II) and/or (III) can represent, in addition to a hydrogen radical, an $R^5$ or O radical; which thus furthermore confers on the polyurethane films the improved properties of protection against UV radiation.

The silicone oil can advantageously also comprise hydroxyaryl units within its structure. These units have antioxidizing properties and properties of protection against UV radiation, the ratio of the number of these hydroxyaryl units to the number of Si units of the silicone oil being between 1 and 15%. In this case, at least a portion of the symbols $R^1$ and $R^5$, which are alike or different, represent a —$(CH_2)_n$(V) (Ar) functional group, where:
n is between 1 and 10,
the V radicals are identical and/or different and represent a divalent radical chosen from —NH—, —NHR'—, —CHN—, —O— or —COO—,
R' is a linear or branched alkyl radical having from 1 to 4 carbon atoms, and
Ar is an aromatic group substituted by at least one OH radical which can be substituted by at least one hydrocarbon-comprising radical comprising from 1 to 4 carbon atoms which can comprise a heteroatom, Ar preferably being a phenol group.

Reference will be made, as examples of hydroxyaryl units, to those disclosed in U.S. Pat. No. 4,430,235 and U.S. Pat. No. 4,879,378.

The polyisocyanate used in the context of the invention can be prepared according to various procedures and from various compounds. The characteristics of the polyisocyanate used can vary from one composition to another while remaining within the scope of the invention. For example, the polyisocyanate can be in the trimer form (ex.: isocyanate units), dimer form (ex.: uretidione units), biuret form or allophanate form or their mixture.

The polyisocyanates used in the context of the invention can be used with or without solvent. The viscosity of the polyisocyanates, as dry matter, obtained and used in the context of the invention is between 20 and 20,000 mPa·s and preferably between 100 and 11,000 mPa·s. Of course, the viscosity of the polyisocyanates given above will decrease when they are measured with solvents. In addition, the NCO content of the polyisocyanates used is between 5 and 65 weight % with respect to the dry matter of the polyisocyanate and preferably between 15 and 25 weight %.

The diisocyanates preferred in the preparation of the polyisocyanates of the compositions according to the invention are those of formula $R(NCO)_2$, in which R is a divalent aliphatic hydrocarbon-comprising group having from 4 to 18 carbon atoms or a heterocyclo-aliphatic group in which the ring comprises from 3 to 15 carbon atoms.

As examples, the following diisocyanates are suitable for the preparation of the polyisocyanates used in the compositions of the invention:

1,4-tetramethylene diisocyanate, 1,6-hexamethylene iisocyanate, 2,2,4-trimethyl-1,6-hexamethylene iisocyanate, 1,12-dodecamethylene diisocyanate, cyclohexane 1,3-diisocyanate, cyclohexane 1,4-diisocyanate, 1-isocyanato-2-isocyanatomethyl-cyclopentane, 1-isocyanato-3-isocyanatomethyl-3,5,5-trimethylcyclohexane, bis(4-isocyanatocyclohexyl) methane, 1,3-bis(isocyanatomethyl)cyclohexane, 1,4-bis(isocyanatomethyl)cyclohexane, bis(4-isocyanato-3-methylcyclohexyl)methane, $\alpha,\alpha,\alpha',\alpha'$-tetramethyl-1, 3- and/or -1,4-xylylene diisocyanate, 1-isocyanato-1-methyl-4(3)-isocyanatomethylcyclohexane, and 2,4- and/or 2,6-hexahydrotoluyl diisocyanate.

The polyisocyanate is preferably prepared by oligocondensation or polycondensation of polymethylene diisocyanate or its derivatives and in particular tetramethylene diisocyanate and hexamethylene diisocyanate.

It is possible, among these polycondensates or oligocondensates, to mention those prepared from mixing the diisocyanates mentioned above with monoisocyanates or polyisocyanates having at least 3 isocyanate groups. More particularly, derivatives comprising (an) isocyanuric ring(s) [denoted under the term of trimer] and derivatives exhibiting a biuret functional group should be mentioned.

Aliphatic or aromatic isocyanates, and preferably aromatic isocyanates, can dimerize at room temperature, more particularly in the presence of a dimerization catalyst, such as triethylphosphine, pyridine, triethylamine or alkoxymetallic complexes Aliphatic or aromatic isocyanates can trimerize at high temperature, in the presence of a trimerization catalyst, such as calcium acetate, sodium formate, hexamethyldisilazane, triethylamine, triphenylphosphine or quaternary ammonium. The trimers obtained form structures which are extremely stable towards heat and towards hydrolytic attacks and are characterized by a molecular weight of between 250 and 5000.

As examples of commercial products, the products sold by Rhône-Poulenc and Bayer AG are appropriate for their use as polyisocyanate in the compositions of the invention. On this subject, mention will be made of the products of the Desmodur range from Bayer AG, including Desmodur N 3390 and Desmodur N 3300, or the products of the Tolonate HDT range from Rhône-Poulenc (Tolonate HDT LV and Tolonate HDT 90).

The hydroxylated acrylic oligomer used in the crosslinkable compositions of the invention exhibits a content by mass of hydroxyl groups of 0.1 to 10% (with respect to the dry matter) and a viscosity of 100 to 20,000 mPa·s, preferably of 1000 to 6000 mPa·s. At least a portion of the OH groups present in the acrylic oligomer are reactive with respect to isocyanate groups during the formation of the polyurethane films from the crosslinkable compositions of the invention.

As examples, the acrylic oligomers comprising hydroxyl groups which can be used in the context of the invention are chosen from: 2-hydroxyethyl acrylate, 2-hydroxypropyl acrylate, 2-hydroxyethyl methacrylate and 3-hydroxypropyl methacrylate.

The acrylic oligomers are generally used in the solution form in solvents and have a viscosity of 4000 to 10,000 mPa·s. Various types of solvents can be used, for example hydrocarbons, esters and ketones, and the like. The solvent used is preferably based on methyl amyl ketone and/or on butyl acetate and additionally comprises other solvents with different boiling points. The solvent used is preferably methyl amyl ketone. The concentration by weight of acrylic oligomer in the solution of the said oligomer is generally between 40 and 80%. In the case where methyl amyl ketone is used as solvent, the concentration by weight of acrylic oligomer is between 50 and 80%. However, it is possible to use acrylic oligomers without solvent in the context of the invention.

As examples of commercial products, the products sold by the companies Rhône-Poulenc, Dupont de Nemours, Johnson, Akzo, Hoechst, Cray Valley and Croda are suitable for their use as hydroxylated acrylic oligomer in the compositions of the invention. Mention will more particularly be made of the products of the Johnson SCX range, in particular 910 and 920, the products of the Setalux range (1753 SS 60, and the like), the products of the Macrynal range (SM 510, and the like), the products of the Synocure range and the products of the Crodaplast range.

Polyurethane films can be prepared from the crosslinkable compositions according to various techniques, in particular by chemical curing, thermal curing, UV radiation or the use of an electron beam.

According to a preferred alternative preparative form, the polyurethane films are obtained by heat treatment at a temperature of between 50 and 200° C. and advantageously between 80 and 150° C. Furthermore, the best results are obtained in the presence of a catalyst, such as dibutyltin dilaurate, tin octanoate or dibutyltin diacetate, thus promoting the reactions between the silicone oil, the polyol and the polyisocyanate. The catalyst used is advantageously dibutytin dilaurate. Other catalysts can also be used to prepare the polyurethane films; on this subject, reference will in particular be made to the document EP 524,501 A1. The catalyst is preferably added immediately before the addition of the polyisocyanate.

As example, the process for the preparation by heat treatment of a polyurethane film comprises the stages consisting in:

(1) mixing the solvent, the hydroxylated oligomer and the silicone oil, (2) adding the polyisocyanate to and mixing with the mixture obtained in (1), (4) spreading the mixture over a surface to be coated, and (5) drying the spread mixture and then curing it at a temperature of between 50° C. and 200° C. for 20 minutes to 1 hour.

As alternative form for the preparation of polyurethane films from crosslinkable compositions according to the invention, the silicone oil is mixed with the acrylic oligomer. The polyisocyanate, the solvent and, optionally, the catalyst are then added to this mixture. It is also possible to bring a portion of the polyisocyanate into contact with the silicone oil beforehand. After these two compounds have reacted with one another, they are then mixed with the acrylic oligomer, the polyisocyanate, if necessary, the solvent and, optionally, the catalyst.

In agreement with the invention, the operating conditions for the preparation of polyurethane films and the compounds of the crosslinkable compositions, i.e. qualities and amounts, are chosen in order for the NCO/XH molar ratio of the polyurethane films to be between 0.5 and 1.5 and preferably between 0.95 and 1.1; NCO being the isocyanate functional group of the polyisocyanate and XH representing OH, NH and SH, which are the reactive functional groups of the acrylic polymer and those of the functionalized silicone oil.

In particular, the controlled miscibility of the silicone oil within the acrylic oligomer and polyisocyanate system allows this oil to migrate at a relatively low rate towards the surface of the said film when it is formed, this low rate furthermore allowing the groups of the silicone oil carrying active hydrogens to react with the polyisocyanate. Thus, most of the silicone oil is found in the surface layer of the film and is fixed in the polyurethane matrix by chemical bonding, which contributes permanent anti-scratching properties, even after the film has been washed several times, confirmed by the examples.

The improvement in the anti-scratching properties is observed in particular by a better gloss of the surface of the film which prevents scratch formation. If, however, scratching occurs, the silicone oil present in the surface layer of the film fills in the scratch (achievement of a minimum energy state), which allows the scratch to be stopped up (healing effect).

The field of use of the polyurethane films obtained from the crosslinkable compositions of the invention is highly varied. The films obtained from the crosslinkable compositions according to the invention can be used equally well for a mass-production coating, a protective coating or for a repair coating. The coatings can, for example, be paints and varnishes. In addition, the films can comprise any conventional pigment (for example for colouring) and additive, such as agents for protecting against light, antioxidizing agents, levelling agents, and the like. As regards the agents for protecting against light, it has been specified previously that the silicone oils used can advantageously be functionalized with functional groups of formula (II) which are radical scavengers of HALS type, i.e. agents which stabilize with respect to light comprising sterically hindered amines, and/or hydroxyaryl functional groups. In this case, the films can comprise, on the one hand, silicone oils functionalized with HALS functional groups and/or hydroxyaryl functional groups and, on the other hand, if necessary, agents for protecting against light, including those with functional groups of HALS type.

The examples below illustrate the preparation of specific silicone oils suited to the crosslinkable compositions in accordance with the invention, and the formulation of the said crosslinkable compositions. In addition, the qualities of the polyurethane films obtained from the crosslinkable compositions are illustrated by the tests below.

EXAMPLES

1. Preparation of the Functionalized Oils

The novel silicone oils of the crosslinkable compositions in accordance with the present invention were prepared by double or triple hydrosilylation of a silicone oil comprising SiH units.

Example 1

Preparation of Compound A 30 g of toluene (dried over an activated molecular sieve) are introduced, via a syringe, into a 250 ml reactor equipped with a stirrer system, a temperature probe and a reflux condenser, the internal space of which reactor has been thermally dried beforehand under a nitrogen stream. The solvent is stirred and the temperature of the medium is brought to 90° C. 60 mg of 4-methoxyphenol and 23 µl of a solution in divinyltetramethyldisiloxane of a platinum catalyst (so-called Karstedt catalyst) comprising 11 weight % of platinum metal are introduced at this temperature.

The following are then gradually run in simultaneously, via two syringes, over a period of 1 h 30:

15.77 g of styrene (i.e., 151.64 mmol), on the one hand and, on the other hand, 50.00 g (i.e., 240.7 meq of SiH functional groups) of a polymethylhydrosiloxane oil, the characteristics of which are Mn=1331 g.mol$^{-1}$ and 4814 meq of SiH functional groups per 1 kg of oil.

After the two reactants have been run in, the degree of conversion of the SiH functional groups is 62 mol %. 15 g of allyl alcohol (258 mmol) are then introduced, via a syringe, over a period of 2 h.

The reaction mass is stirred at this temperature for 15 h. The degree of conversion of the SiH functional groups is then 100 mol %.

The solvent and the residual monomers are subsequently removed by devolatilization, which takes place at 120° C. under a vacuum of 4×10$^2$ Pa for 1 h.

59 g of a slightly coloured oil are recovered, the characteristics of which oil, defined by N.M.R., are as follows:

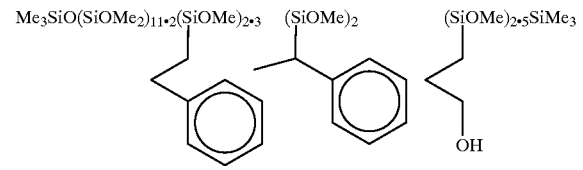

Example 2

Preparation of Compound B 54.75 g of toluene (stored over a molecular sieve) are introduced, via a syringe, into a 500 ml reactor, dried thermally beforehand under a nitrogen stream, equipped with a mechanical stirrer system, a temperature probe and a reflux condenser. The solvent is stirred and the temperature of the medium is brought to 90° C. 93 mg of 4-methoxyphenol and 41 µl of a solution in divinyltetramethyldisiloxane of a platinum catalyst (so-called Karstedt catalyst) comprising 11 weight % of platinum metal are introduced at this temperature. A mixture composed of:

47.42 g of styrene (i.e., 456 mmol), and 90 g (i.e., 617.7 meq of SiH functional groups) of a polymethylhydrosiloxane oil, the characteristics of which are Mn=1267 g.mol$^{-1}$ and 6864 meq of SiH functional groups per 1 kg of oil, is then gradually run in, via a peristaltic pump, over a period of 1 h 30.

After the mixture has been run in, the degree of conversion of the SiH functional groups is 70 mol %. 30 μl of the same so-called Karstedt catalyst are then introduced into the reaction mass. The operating conditions for stirring and heating are maintained for 18 h. The degree of conversion of the SiH functional groups is then 73 mol %.

36.04 g of allyloxyethanol (i.e., 352.9 mmol) and 10 μl of the same so-called Karstedt catalyst are then introduced, via a dropping funnel, over a period of 3 h.

After the reactant and catalyst have been run in, the degree of conversion of the SiH functional groups is then 91 mol %. The reaction mass is stirred at this temperature for 17 h. The degree of conversion of the SiH functional groups is then 100 mol %.

The solvent and the residual monomers are removed by devolatilization, which takes place at 130° C. under $6.5 \times 10^2$ Pa for 2 h 30. 150 g of a slightly coloured oil are recovered, the characteristics of which oil, defined by nuclear magnetic resonance, are as follows:

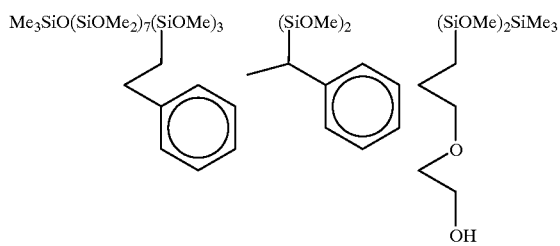

Example 3

Preparation of Compound C 56.61 g of toluene (stored over a molecular sieve) are introduced, via a syringe, into a 500 ml reactor, thermally dried beforehand under nitrogen, equipped with a mechanical stirrer system, a temperature probe and a reflux condenser. The solvent is stirred and the temperature of the medium is brought to 90° C. 140 mg of 4-methoxyphenol and 80 μl of a solution in divinyltetramethyldisiloxane of a platinum catalyst (so-called Karstedt catalyst) comprising 11 weight % of platinum metal are introduced at this temperature. A mixture composed of:

- 76.44 g of styrene (i.e., 735 mmol), on the one hand, and
- 150 g (i.e., $10^{29}$ meq of SiH functional groups) of a polymethylhydrosiloxane oil, on the other hand, the characteristics of which are Mn=1267 g.mol$^{-1}$ and 6864 meq of SiH functional groups per 1 kg of oil, is then gradually run in, via a peristaltic pump, over a period of 1 h 30.

After the mixture has been run in, the degree of conversion of the SiH functional groups is 66 mol %. 50 μl of the same so-called Karstedt catalyst are introduced into the reaction mass. The operating conditions for stirring and heating are maintained for 17 h. The degree of conversion of the SiH functional groups is then 71.5 mol %. The solvent and the residual monomers are removed by devolatilization, which takes place at 110° C. under a vacuum of $6.5 \times 10^2$ Pa for 2 h. 221 g of a slightly coloured oil are recovered, the general formula of which oil is (1220 meq of SiH functional groups per 1 kg of oil):

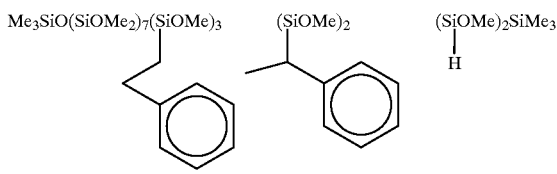

Example 4

Preparation of Compound D 25.10 g of toluene (stored over a molecular sieve), on the one hand, and 17.82 g of allyloxytetramethylpiperidine (i.e., 90.4 mmol) are introduced, via a syringe, into a 250 ml reactor, thermally dried under nitrogen, equipped with a mechanical stirrer system, a temperature probe, a reflux condenser and a pressure equalizing dropping funnel. The mixture is stirred and the temperature of the medium is brought-to 90° C. 40 μl of a solution in divinyltetramethyldisiloxane of a platinum catalyst (so-called Karstedt catalyst) comprising 11 weight % of platinum metal are introduced at this temperature. 70 g of Compound C, prepared in Example 3, are then gradually run in, via the dropping funnel, over a period of 1 h 30.

After Compound C has been run in, the degree of conversion of the SiH functional groups is 83%. 30 μl of the same so-called Karstedt catalyst are introduced into the reaction mass. These operating conditions for stirring and heating are maintained for 19 h. The degree of conversion of the SiH functional groups is then 100 mol %.

The solvent and the residual monomers are removed by devolatilization at 130° C. under $1.4 \times 10^2$ Pa for 1 h 30. 80 g of a slightly coloured oil are recovered, the characteristics of which oil are as follows:

981 meq of SiH functional groups per 1 kg of oil,
mean structure (determined by N.M.R.):

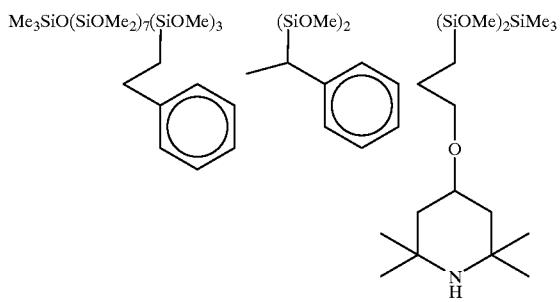

Example 5

Preparation of Compound E 22.57 g of toluene (stored over a molecular sieve), on the one hand, and 20.30 g of (octa-2,7-dienyloxy) trimethylsilane (i.e., 103 mmol) are successively introduced, via a syringe, into a 250 ml reactor, thermally dried beforehand under nitrogen, equipped with a mechanical stirrer system, a temperature probe, a reflux condenser and a pressure equalizing dropping funnel. The mixture is stirred and the temperature of the medium is brought to 90° C. 35 μl of a solution in divinyltetramethyldisiloxane of a platinum catalyst (so-called Karstedt catalyst) comprising 11 weight % of platinum metal are introduced at this temperature. 70 g of polymethylhydrostyrenyl-siloxane oil C, obtained in Example 3, are then gradually run in, via the dropping funnel, over a period of 1 h 30.

After the oil has been run in, the degree of conversion of the SiH functional groups is 93%. 20 μl of the same so-called Karstedt catalyst are introduced into the reaction mass. These operating conditions for stirring and heating are maintained for 18 h. The degree of conversion of the SiH functional groups is then 100 mol %.

The solvent and the residual monomers are removed by devolatilization, which takes place at 130° C. under 1.33×10² Pa for 3 h. 85 g of a slightly coloured oil are recovered, the mean structure of which oil (determined by N.M.R.) is as follows:

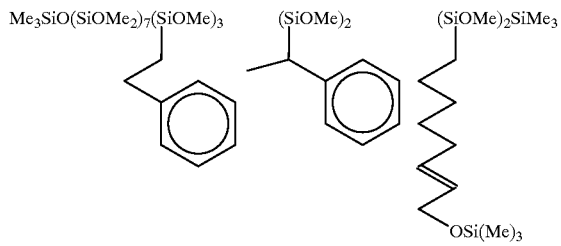

Example 6

Preparation of Compound F 67 g of the bifunctionalized oil E obtained in Example 5, i.e. 78 mmol of OSi(Me)₃ units, are introduced into a 1 l reactor equipped with a mechanical stirrer system. This oil is dispersed in 715 ml of a mixture composed of acetic acid, tetrahydrofuran and water, the proportions of which by volume are respectively 4, 2 and 1. Vigorous stirring is maintained for 24 h at room temperature.

At the end of the reaction, the solvents are removed by several entrainments with toluene, which take place at 80° C. under a vacuum of 2.5×10² Pa for 30 min. 61 g of a slightly coloured oil are recovered, the mean structure of which oil is as follows (N.M.R.):

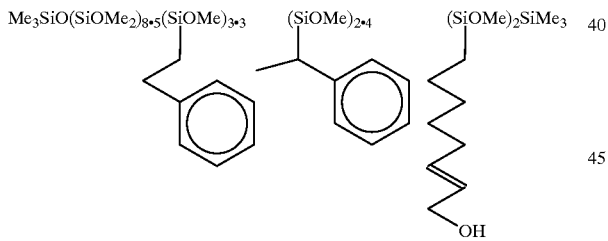

Example 7

Preparation of Compound G 54.15 g of toluene (stored over a molecular sieve) are introduced, via a syringe, into a 500 ml reactor, thermally dried beforehand under nitrogen, equipped with a mechanical stirrer system, a temperature probe and a reflux condenser. The solvent is stirred and the temperature of the medium is brought to 90° C. 410 mg of 4-methoxyphenol and 110 μl of a solution in divinyltetramethyldisiloxane of a platinum catalyst (so-called Karstedt catalyst) comprising 11 weight % of platinum metal are introduced at this temperature. A mixture composed of 54.15 g of styrene (i.e., 520.8 mmol) and of 128 g (i.e., 911.4 meq of SiH functional groups) of a polymethylhydrosiloxane oil, the characteristics of which are Mn=1267 g.mol⁻¹ and 7120 meq of SiH functional groups per 1 kg of oil, is then gradually run in, via a peristaltic pump, over a period of 1 h 30.

After the mixture has been run in, the degree of conversion of the SiH functional groups is 51.5 mol %. The operating conditions for stirring and heating are maintained for 9 h. The degree of conversion of the SiH functional groups is then 56 mol %. 36.04 g of allyloxypentamethylpiperidine (i.e., 130.2 mmol) are then introduced, via a syringe driver, over a period of 3 h. After the reactant has been run in, the degree of conversion of the SiH functional groups is 70.1 mol %. 20 μl of the same so-called Karstedt catalyst are introduced into the reaction mixture. The operating conditions for stirring and heating are maintained for 12 h. The degree of conversion of the SiH functional groups is then 71 mol %. 45.27 g of allyl alcohol (i.e., 780.5 mmol) and 20 μl of the same so-called Karstedt catalyst are then gradually run in, via a syringe driver, over a period of 3 h.

After the reactant and catalyst have been run in, the degree of conversion of the SiH functional groups is then 97%. The operating conditions for stirring and heating are maintained for 20 h. The degree of conversion of the SiH functional groups is then 100%.

The solvent and the residual monomers are removed by devolatilization, which takes place at 130° C. under 6.5×10² Pa for 3 h 30. 215 g of a slightly coloured oil are recovered, the characteristics of which oil are as follows:

543 meq of SiH functional groups per 1 kg of oil,
mean structure (determined by N.M.R.):

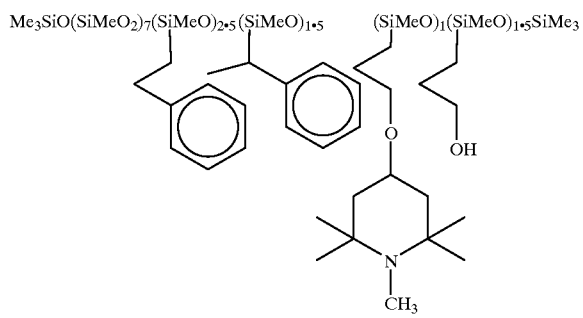

Example 8

Preparation of Compound H 66.0 g of toluene (stored over a molecular sieve) are introduced, via a syringe, into a 500 ml reactor, thermally dried under nitrogen, equipped with a mechanical stirrer system, a temperature probe and a reflux condenser. The solvent is stirred and the temperature of the medium is brought to 90° C. 410 mg of 4-methoxyphenol and 90 μl of a solution in divinyltetramethyldisiloxane of a platinum catalyst (so-called Karstedt catalyst) comprising 11 weight % of platinum metal are introduced at this temperature. A mixture composed of 62.45 g of styrene (i.e., 600.5 mmol) and of 200 g (i.e., 1401.2 meq of SiH functional groups) of a polymethylhydrosiloxane oil, the characteristics of which are Mn=1267 g.mol⁻¹ and 7006 meq of SiH functional groups per 1 kg of oil, is then gradually run in, via a peristaltic pump, over a period of 1 h 30.

After the mixture has been run in, the degree of conversion of the SiH functional groups is 31.5 mol %. The operating conditions for stirring and heating are maintained for 10 h. The degree of conversion of the SiH functional groups is then 42.5 mol %. 59.35 g of vinyltrimethoxysilane (i.e., 400.4 mmol) are then introduced, via a syringe driver, over a period of 3 h. The operating conditions for stirring and heating are maintained for 11 h. The degree of conversion of the SiH functional groups is then 72 mol %. 34.83 g of allyl alcohol (i.e., 600.5 mmol) and 30 μl of the same so-called Karstedt catalyst are then gradually run in, via a syringe driver, over a period of 3 h.

After the reactant and catalyst have been run in, the degree of conversion of the SiH functional groups is then 91.5%. The operating conditions for stirring and heating are maintained for 20 h. The degree of conversion of the SiH functional groups is then 100%.

The solvent and the residual monomers are removed by devolatilization, which takes place at 130° C. under a vacuum of $6.5 \times 10^2$ Pa for 3 h 30. 341.5 g of a slightly coloured oil are recovered, the mean structure of which oil (determined by N.M.R.) is as follows:

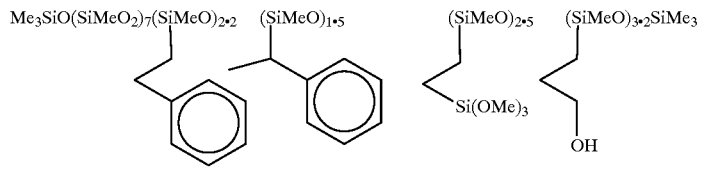

2. Preparations of Polyurethane Films from the Crosslinkable Compositions According to the Invention A. The tested crosslinkable compositions comprise Compound A and are prepared by mixing the identified components. The amounts of the components are shown in Table 1; all the indications relating to the parts and to the percentages are given by weight, the percentages being between brackets.

TABLE 1

| COMPOSITIONS | Co1 (Control) | Co2 | Co3 | Co4 |
|---|---|---|---|---|
| Polyisocyanate[1] | 19.3 | 3.26 | 19.3 | |
| SCX 920[2] | 50.9 | 8.05 | 50.9 | 50.9 |
| Dibutyltin dilaurate | | 0.01 | | |
| Compound A (% Compound A/dry matter) | | 0.29 (1.5) | 0.6 (1.0) | |
| Butyl acetate | 29.8 | 8.39 | 29.2 | 29.2 |
| Polyisocyanate[1] comprising % of Compound A[3] | | | | 19.9 |

TABLE 1-continued

| COMPOSITIONS | Co1 (Control) | Co2 | Co3 | Co4 |
|---|---|---|---|---|
| NCO/OH (molar) | 1.05 | 1.1 | 1.05 | 1.05 |
| Dry matter (%) | 60 | 50 | 60 | 60 |

[1]Solvent-free liquid aliphatic polyisocyanate of trimer type of low viscosity comprising 23% of NCO functional groups and with a dry matter content of 100% (Tolonate HDT-LV, sold by Rhône-Poulenc).
[2]Acrylic oligomer comprising hydroxyl groups with an OH number of 140 and in a proportion of 80% in methyl n-amyl ketone (product sold by Johnson Polymer).
[3]Compound A prereacts with the polyisocyanate for 16 h at 40° C.

The compositionss Co1 to Co4 thus obtained are applied to a glass plate (350×105×2 mm) by using a Ericksen coating device at a controlled speed giving a wet film with a thickness of 100 µm. The films are crosslinked by heat treatment in an oven or by changing at room temperature in a climate-controlled room for several days.

B. The crosslinkable compositions according to the invention comprising Compounds B, D, F, G and H are prepared by mixing the identified components, the amounts of which are shown in Table 2. All the indications relating to the parts and to the percentages are given by weight, the percentages being between brackets.

TABLE 2

| COMPOSITIONS | Co5 (Control) | Co6 | Co7 | Co8 | Co9 | Co10 |
|---|---|---|---|---|---|---|
| Polyisocyanate[1] | 16.67 | 16.67 | 16.67 | 16.67 | 16.67 | 16.67 |
| SCX 920[2] | 43.25 | 42.37 | 42.42 | 42.37 | 42.34 | 42.34 |
| Dibutyltin dilaurate | 0.01 | 0.01 | 0.01 | 0.01 | 0.01 | 0.01 |
| Compound | | B | D | F | G | H |
| (% compound/dry matter) | | 1.56 | 1.56 | 1.56 | 1.56 | 1.56 |
| | | (3.08) | (3.08) | (3.08) | (3.07) | (3.08) |
| Butyl acetate | 25.53 | 26.24 | 26.26 | 26.24 | 26.24 | 26.24 |
| NCO/OH (molar) | 1.05 | 1.05 | 1.05 | 1.05 | 1.05 | 1.05 |
| Dry matter (%) | 60 | 60 | 60 | 60 | 60 | 60 |

[1]Solvent-free liquid aliphatic polyisocyanate of trimer type of low viscosity comprising 23% of NCO functional groups and with a dry matter content of 100% (Tolonate HDT-LV, sold by Rhône-Poulenc).
[2]Acrylic oligomer comprising hydroxyl groups with an OH number of 140 and in a proportion of 80% in methyl n-amyl ketone (product sold by Johnson Polymer).

3. Applicational Tests on the Compositions According to the Invention

Evaluation tests on the properties of the films or coatings described below make it possible to demonstrate the improved properties and in particular a better resistance to scratch formation of the coatings Ctg1 to Ctg19 obtained from the crosslinkable compositions Co1 to Co10.

A. Appearance of the plates after curing

It is observed that the quality of the coating, judged by the external appearance of the plates, is perfect. The curing conditions and the appearance of the plates comprising the silicone oils A, B, D, F, G or H are described in Tables 3 and 4.

TABLE 3

| Coating | Ctg1* | Ctg2 | Ctg3 | Ctg4 | Ctg5* | Ctg6 | Ctg7 | Ctg8 | Ctg9 | Ctg10 |
|---|---|---|---|---|---|---|---|---|---|---|
| Composition | Co1 | Co2 | Co3 | Co4 | Co1 | Co3 | Co4 | Co1 | Co3 | Co4 |
| Appearance | ¤ | ¤ | ¤ | ¤ | ¤ | ¤ | ¤ | ¤ | ¤ | ¤ |
| Curing | 80° C. 30 min | 150° C. 10 min | 80° C. 30 min | 80° C. 30 min | 23° C. 7 days | 23° C. 7 days | 23° C. 7 days | 23° C. 15 days | 23° C. 15 days | 23° C. 15 days |

¤ transparent film with a perfect appearance
Ctg1*, Ctg5*: control coating

TABLE 4

| Coating | Ctg11* | Ctg12 | Ctg13 | Ctg14 | Ctg15 | Ctg16 | Ctg17 | Ctg18 | Ctg19 |
|---|---|---|---|---|---|---|---|---|---|
| Composition | Co5 | Co6 | Co7 | Co8 | Co8 | Co8 | Co8 | Co9 | Co10 |
| Appearance | ¤ | ¤ | ¤ | ¤ | ¤ | ¤ | ¤ | ¤ | ¤ |
| Curing | 80° C. 30 min | 80° C. 30 min | 80° C. 30 min | 80° C. 30 min | 110° C. 30 min | 130° C. 30 min | 150° C. 30 min | 80° C. 30 min | 80° C. 30 min |

¤ transparent film with a perfect appearance
Ctg11*: control coating

B. Resistance to scratching i) The transparent coatings Ctg1 and Ctg3 to Ctg10 were subjected to the tests of resistance to scratching.

The glass plates are fixed and then subjected to scratching operations under the pressure of a weight of 500 g at the rate of 5 passes at a steady and moderate speed in one direction and 5 passes in the other direction of:

- a dry pad with dimensions of 150×38.4 mm of Scotch-Brite® ultrafine trade mark from Dupont,
- a wet pad with dimensions of 150×38.4 mm of Scotch-Brite® ultrafine type from Dupont,
- a tracing paper (reference NFE 04502 from Photogay, Lyons, France).

The pad of Scotch-Brite trade mark or the tracing paper is replaced for each type of coating.

The more or less significant presence of scratches is evaluated by measuring the loss in gloss of the coating. These measurements are carried out using an Ericksen glossmeter with an incident beam of 20°. 5 measurements were carried out for each plate at defined points.

The measurements are carried out on:

- plates which have not been subjected to the scratch test,
- plates which have been subjected to the scratch test, 1 h later (see Table 5),
- plates which have been subjected to the scratch test, 1 month later (see Table 6).

The results are expressed as percentage of loss in gloss of the coating after and before carrying out the scratch test.

TABLE 5

| Coating | Ctg2 | Ctg3 | Ctg4 | Ctg5 | Ctg6 | Ctg7 | Ctg8 | Ctg9 | Ctg10 |
|---|---|---|---|---|---|---|---|---|---|
| Dry Scotch-Brite | 26 | 5 | 5 | 21 | 20 | 17 | 24 | 21 | 20 |
| Wet Scotch-Brite | 7 | 5 | 4 | 16 | 15 | 16 | 19 | 16 | 17 |
| Tracing paper | 4 | 2 | 2 | 14 | 7 | 4 | 12 | 4 | 7 |

TABLE 6

| Coating | Ctg2 | Ctg3 | Ctg4 | Ctg5 | Ctg6 | Ctg7 | Ctg8 | Ctg9 | Ctg10 |
|---|---|---|---|---|---|---|---|---|---|
| Dry Scotch-Brite | 29 | 7 | 6 | 7 | 7 | 6 | 3 | 3 | 5 |
| Wet Scotch-Brite | 8 | 5 | 2 | 4 | 4 | 3 | 3 | 1 | 1 |
| Tracing paper | 6 | 5 | 1 | 5 | 3 | 4 | 1 | 0 | 1 | ii) Other scratch tests were carried out on the coatings Ctg11 to Ctg19.

The glass plates are fixed and then subjected to scratching operations under the pressure of a weight of 600 g at the rate of 15 to-and-fro movements at a steady and moderate speed. Equipment used:

A Veratec® cotton cloth with dimensions of 150×150 mm (Graphic Arts Cheesecloth), a Bon-Ami® abrasive powder (Bon Ami Co., Kansas City, Mo. 64101), an abrasimeter.

The friction between the weight and the abrasive powder leads to the formation of scratches. The cotton cloth and the abrasive powder are replaced for each type of coating. The more or less significant presence of scratching is evaluated by measuring the loss in gloss of the coating. These measurements are carried out using an Ericksen glossmeter with an incident beam of 20°. For each plate, 3 measurements at well-defined points are carried out.

The measurements are carried out on plates:

which have not been subjected to the scratch test which have been subjected to the scratch test, 1 h later which have been subjected to the scratch test, 7 days later.

The results (Table 7) are expressed as percentage of loss in gloss of the coating before and after carrying out the scratch test.

TABLE 7

| | Ctg11 | Ctg12 | Ctg13 | Ctg14 | Ctg15 | Ctg16 | Ctg17 | Ctg18 | Ctg19 |
|---|---|---|---|---|---|---|---|---|---|
| Loss in gloss (%) (1 h after scratching) | 35.2 | 28.7 | 18.4 | 27.9 | 29.4 | 28.3 | 22.6 | 25.7 | 28.6 |
| Loss in gloss (%) (7 d after scratching) | 20.3 | 14.9 | 3.3 | 14.3 | 15.3 | 16.1 | 14.3 | 10.6 | 14.9 |

C. Measurements of the surface energy

The surface energy was measured under the following conditions: a drop of doubly-distilled water and a drop of diiodomethane are placed on each plate coated with polyurethane films obtained from crosslinkable compositions according to the invention and from other compositions not comprising silicone; during the deposition of the drop, the contact angle between the latter and the surface of the plate is measured; by taking into account the surface tension values of water and of diiodomethane, the surface energy ($\gamma S$) and these polar $\gamma P$ and dispersive $\gamma D$ components are calculated.

TABLE 8

| Coating | Ctg1 | Ctg3 | Ctg4 | Ctg11 | Ctg12 | Ctg14 | Ctg18 | Ctg19 |
|---|---|---|---|---|---|---|---|---|
| $\gamma P$ | 2.2 | 2.0 | 1.9 | 1.8 | 2.4 | 3.4 | 3.8 | 3.4 |
| $\gamma D$ | 33.3 | 23.4 | 24.3 | 36.4 | 24.1 | 23.2 | 22.1 | 22.2 |
| $\gamma S$ | 35.5 | 25.4 | 26.0 | 38.2 | 26.5 | 26.9 | 25.8 | 25.6 |

The results in Table 8 show that the coatings composed of polyurethane films according to the invention have a lower surface energy than that of the coatings resulting from silicone-free compositions (Ctg1 and Ctg11); this expresses in particular that the coatings composed of polyurethane films comprise silicone oil at the surface.

Furthermore, surface energy measurements have also been carried out on coatings after the latter have been subjected to a washing operation. In this case, the washing operation consists in wiping the coating three times with paper wadding impregnated with isopropanol at the rate of 4 to-and-fro movements, the wadding being changed for each wiping operation. The results in Table 9 show that the surface energy is always lower for the coatings according to the invention in comparison with that of the silicone-free coatings, which therefore expresses the lasting and continual presence of the silicone oil within the polyurethane matrix after washing (no removal of the silicone oil at the surface of the said film).

TABLE 9

| Coating | Ctg1 (control) | Ctg3 | Ctg4 | Ctg12 | Ctg13 | Ctg14 | Ctg15 | Ctg19 |
|---|---|---|---|---|---|---|---|---|
| γP | 2.2 | 2.0 | 1.9 | 3.6 | 2.6 | 3.8 | 2.6 | 4.3 |
| γD | 33.3 | 23.4 | 24.3 | 22.8 | 27.5 | 24.7 | 22.6 | 21.5 |
| γS | 35.5 | 25.4 | 26.0 | 26.5 | 30.1 | 28.6 | 25.2 | 25.8 |

What is claimed is:

1. A crosslinkable composition comprising:
   (a) 20 to 50 weight % of polyisocyanate,
   (b) 50 to 80 weight % of acrylic oligomer comprising hydroxyl groups, the content by weight of which with respect to the acrylic oligomer is from 0.1 to 10%,
   (c) 1 to 10 weight % of a silicone oil of formula (I):

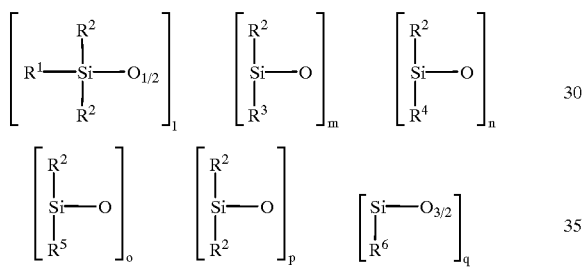

(I)

wherein:
   (1) o and p are identical or different integers from 1 to 100,
   (2) l represents an integer such that l=2+q,
   (3) q represents an integer from 0 to 10,
   (4) m represents an integer from 1 to 60,
   (5) n is an integer such that 20<(100×m)/(m+n)<60,
   (6) the symbols $R^1$ and $R^2$ are identical or different and represent a hydrocarbon-comprising radical selected from the group consisting of linear or branched alkyl radicals having from 1 to 4 carbon atoms, linear or branched alkoxy radicals having from 1 to 4 carbon atoms, aryl radicals and alkylaryl radicals,
   (7) the symbols $R^3$ and $R^4$ are identical or different are: monovalent —$(CH_2)_h$—Si—$(R^1)_3$ radicals, wherein h is an integer from 1 to 10, or
   monovalent aromatic alkylaryl radicals, the linear or branched alkyl part comprising 1 to 4 carbon atoms,
   (8) the symbols $R^5$ and $R^6$ are identical or different and represent a monovalent functional group selected from the group consisting of:
   a monovalent primary amine of formula —$R^7$—$NH_2$, wherein $R^7$ is a linear, branched or cyclic alkyl radical having from 1 to 6 carbon atoms,
   a monovalent secondary amine of formula: —$R^8$—NH—$R^9$ wherein $R^8$ and $R^9$, which are identical or different, are linear, branched or cyclic alkyl chains having from 1 to 6 carbon atoms,
   a monovalent —$(CH_2)_a(NHCH_2CH_2)_bNH_2$ radical wherein a and b are independent integers:
   a is from 1 to 10,
   b is from 1 to 10,
   a monovalent —$(CH_2)_c(OCH_2CH_2)_d(OCH_2CHCH_3)_eOH$ radical wherein c, d and e are independent integers:
   c is from 1 to 20,
   d is from 0 to 70,
   e is from 0 to 70,
   a monovalent —$(CH_2)_f SH$ radical wherein f is an integer ranging from 1 to 10, and
   a monovalent —$(CH_2)_g$—$C(R')_2$—OH radical wherein g is an integer ranging from 1 to 10, and R' represents a hydrocarbon-comprising radical selected from the group consisting of a linear alkyl radical having from 1 to 4 carbon atoms, a branched alkyl radical having from 1 to 4 carbon atoms, aryl radicals and alkylaryl radicals.

2. The crosslinkable composition according to claim 1, wherein the silicone oil is weakly miscible in the mixture of acrylic oligomer and of polyisocyanate.

3. The crosslinkable composition according to claim 1 comprising:
   (a) 20 to 40 weight % of polyisocyanate,
   (b) 60 to 80 weight % of hydroxylated acrylic oligomer, and
   (c) 1 to 4 weight % of a silicone oil of formula (I).

4. The crosslinkable composition according to claim 3, comprising:
   (a) 30% weight % of polyisocyanate,
   (b) 70% weight % of hydroxylated acrylic oligomer, and
   (c) 2 to 3 weight % of a silicone oil of formula (I).

5. The crosslinkable composition according to claim 1, wherein the acrylic oligomer comprises from 2.5 to 4.5% of hydroxyl groups.

6. The crosslinkable composition according to claim 1, wherein the polyisocyanate is prepared from polymethylene diisocyanate or from its derivatives.

7. The crosslinkable composition according to claim 6, wherein the polymethylene diisocyanate is tetramethylene diisocyanate or hexamethylene diisocyanate.

* * * * *